(12) United States Patent
Yao et al.

(10) Patent No.: US 10,747,668 B2
(45) Date of Patent: Aug. 18, 2020

(54) EFFICIENT GLOBAL CACHE PARTITION AND DYNAMIC SIZING FOR SHARED STORAGE WORKLOADS

(71) Applicant: VMware, Inc., Palo Alto, CA (US)

(72) Inventors: Zhihao Yao, Cupertino, CA (US); Tan Li, Mountain View, CA (US); Sunil Satnur, Cupertino, CA (US); Kiran Joshi, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/178,515

(22) Filed: Nov. 1, 2018

(65) Prior Publication Data

US 2020/0142828 A1    May 7, 2020

(51) Int. Cl.
*G06F 12/08*    (2016.01)
*G06F 12/084*    (2016.01)

(52) U.S. Cl.
CPC ...... *G06F 12/084* (2013.01); *G06F 2212/622* (2013.01)

(58) Field of Classification Search
CPC combination set(s) only.
See application file for complete search history.

(56) References Cited

U.S. PATENT DOCUMENTS

2015/0127912 A1*   5/2015   Solihin .................... G06F 1/32
                                                        711/125

* cited by examiner

*Primary Examiner* — Yong J Choe

(57) ABSTRACT

A shared cache memory can be logically partitioned among different workloads to provide isolation between workloads and avoid excessive resource contention. Each logical partition is apportioned a share of the cache memory, and is exclusive to a respective one of the workloads. Each partition has an initial size allocation. Historical data can be collected and processed for each partition and used to periodically update its size allocation.

20 Claims, 7 Drawing Sheets

EFFICIENT GLOBAL CACHE PARTITION AND DYNAMIC SIZING FOR SHARED STORAGE WORKLOADS

CROSS REFERENCE TO RELATED APPLICATIONS

This application is related to U.S. application. Ser. No. 16/209,965, filed Dec. 4, 2018, "Tree Structure Aware Cache Eviction Policy," the content of which is incorporated herein by reference in its entirety for all purposes.

BACKGROUND

Caching provides faster access to data than can be achieved by accessing data from regular random access memory (memory caches) or by accessing data from fast disk storage (disk caches). The purpose of a cache memory (cache) is to store program instructions and/or data that are used repeatedly in the operation of a computer system. The computer processor can access such information quickly from the cache rather than having to get it from computer's main memory, or from disk as the case may be, thus increasing the overall speed of the computer system.

A disk cache holds data that has recently been read and, in some cases, adjacent data areas that are likely to be accessed next. Write caching can also be provided with disk caches. Data is typically cached in units called blocks, which are the increments of data that disk devices use. Block sizes can be 512 Bytes, 1024 (1K) Bytes, 4K Bytes, etc.

How to design an efficient disk cache is a much investigated topic in both academia and industry. A global cache that is shared by multiple concurrent data objects on a distributed storage system presents some challenges. For example, it can be quite challenging to configure the global cache size, provide necessary cache resource isolation for each disk, fairly share the cache space, and ensure high cache hit ratio among all the disks under different I/O workloads. Blindly allocating a large cache with too many slots may not guarantee a higher cache hit ratio, and can also waste precious kernel memory space. On the other hand, insufficient cache space can result in excessive cache misses and I/O performance degradation. Moreover, a busy disk can eat up the cache space and lead to noisy neighbor issues.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 5A, 5B, and 5C show process flows in the cache manager in accordance with the present disclosure.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
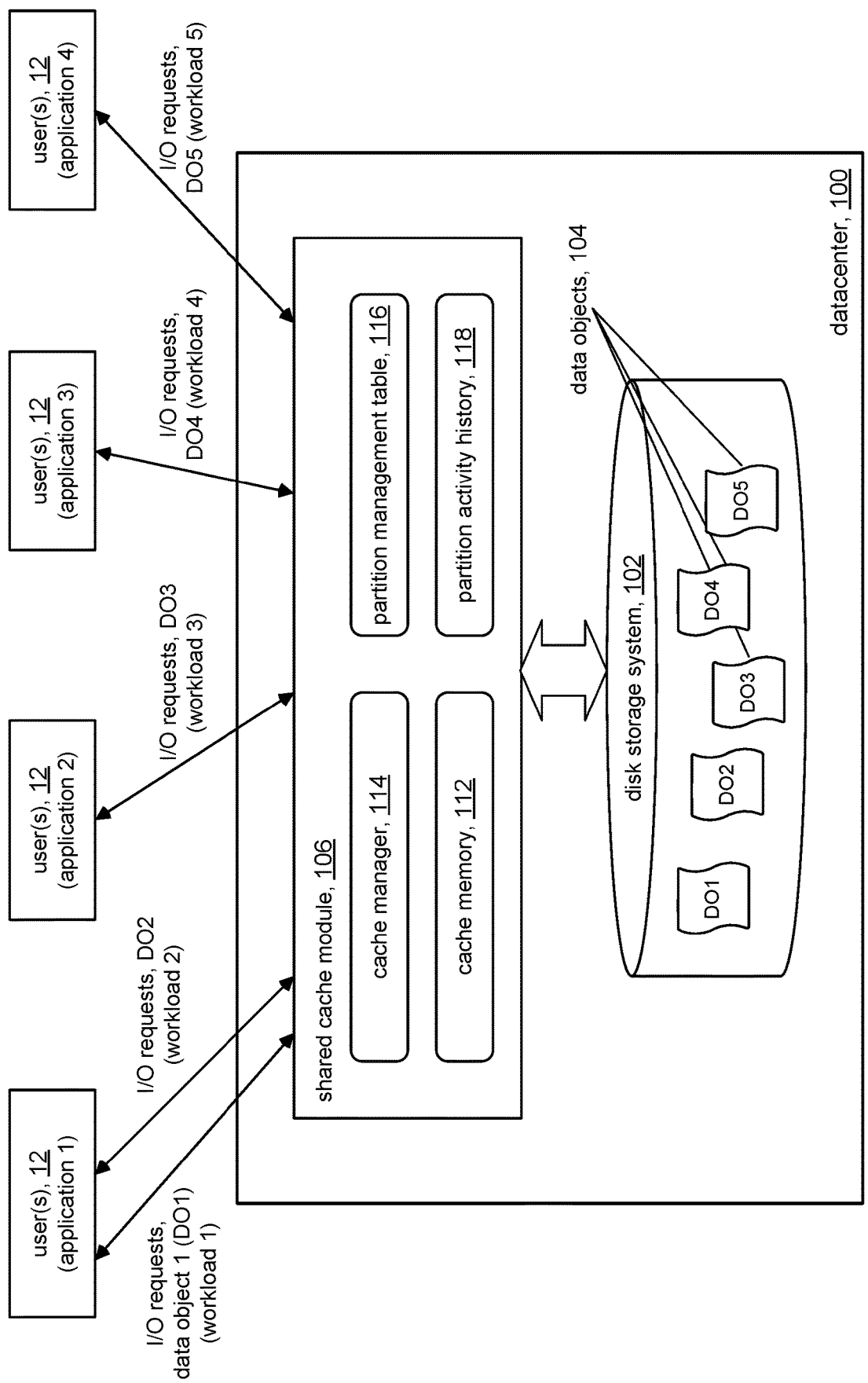
FIG. 1 shows a system in accordance with some embodiments of the present disclosure.

FIG. 1 shows an example of a datacenter 100 to illustrate aspects of shared caching in accordance with the present disclosure. It will be appreciated that shared caching can be used in other contexts, and that the datacenter 100 can be used to as an example without loss of generality.

The datacenter 100 can include a disk storage system 102. The disk storage system 102 can be based any suitable storage architecture. In some embodiments, for example, the underlying physical storage technology can include storage area networks (SAN), direct-attached storage (DAS), network attached storage (NAS), and so on. In some embodiments, the disk storage system 102 can include a virtualized layer on top of the underlying physical storage, which can comprise different storage architectures.

The disk storage system 102 can store data in units of data objects 104. In embodiments of the present disclosure, a data object 104 can refer to a file or a block device, but more generally can be any set or groups of data that are accessed as a logical unit. Regardless of the nature and structure of the data in a data object 104, the data object can be identified by a universally unique identifier (UUID). Data objects 104 can be created by users of the datacenter 100. For example, users can create data files such as text documents, spreadsheets, audio files, video files, etc. A data object can reside entirely on one disk storage device that comprises the disk storage system 102, or can be distributed across multiple disk storage devices in the disk storage system 102.

Data objects 104 can be created by the applications that are not directly accessed by a user. For example, a database application may store its data tables (user accessible) in corresponding data objects 104 on the disk storage system 102, and may store auxiliary tables (not user accessible) such as internal index tables which can also be stored in their own respective data objects 104.

The datacenter 100 can include a shared cache module 106. In some embodiments in accordance with the present disclosure, the shared cache module 106 can serve as a global cache to cache frequently accessed data within the data object (workloads) of the datacenter 102. In other words, an I/O operation made to the disk storage system 102 (e.g., to read in data) is "cached" in the sense that if the data is already in the cache, then the I/O operation is performed by reading data from the cache instead of the slow backend data storage. The shared cache module 106 can include a shared cache memory 112 to store data associated with the I/O requests. A cache manager 114 can manage the cache memory 112 in accordance with the present disclosure. In accordance with some embodiments of the present disclosure, the shared cache module 106 can include a partition management table 116 and a partition activity history 118. As will be discussed in more detail below, the cache memory 112 can be organized into logical partitions that are associated with respective workloads. The partition management table 116 can manages these partitions. The partition activity history 118 can contain a history of data that have been cached in the cache memory; for example, data relating to the level of activity in each partition.

In general, the shared cache module 106 can be used to cache data the comprises a data object 104 that has been read from the disk storage system 102, and to stage data to be written to the data object 104. Data can be cached in units based on the storage unit of the disk storage system 102; e.g., 4K blocks, 8K blocks, etc. In some embodiments, slots in the cache memory 112 can be based on these block sizes.

The shared cache module 106 can be used to cache data relating to the data object 104 rather that the actual data comprising the data object, such data is often referred to as "metadata." An example of metadata is the logical block to physical block mapping. The data blocks that comprise a data object 104 can be accessed using logical block addresses (LBAs) to access data in the specific context of the data that is contained in the data object. As a simple example, consider a data object that is a text file and assume 4K data blocks. The logical block addresses may start with block #1 for the first 4K characters in the text file data object. The next 4K characters may be stored in logical data block #2, the 4K characters after that may be stored in logical data block #3, and so on. On the other hand, the same data blocks as stored on the disk storage system 102 are addressed by their physical block addresses (PBAs), which identify their physical location in the disk storage system 102. An LBA-to-PBA map is metadata to map a logical block of data to its location in the disk storage system 102.

Data objects 104 can be very large; for example, a data object for a data table in a database may comprise many hundreds to thousands of data blocks. Accordingly, the LBA/PBA map (i.e., the metadata for the data object) can be correspondingly large. A B+ tree structure can be used to represent a large LBA/PBA map to provide efficient access (random access, ranged access) to the data comprising data object. In some instances, the internal nodes of the tree can store data blocks comprising LBA-to-PBA mapping information (metadata) of the data blocks that comprise the data object, while the leaf nodes are data blocks that contain the actual data of the data object. In some instances, a data object can be so large that even the B+ tree structure itself is stored as a data object 104 on the disk storage system 102. As such data blocks comprising the B+ tree structure can be cached for more efficient read access to the B+ tree.

The datacenter 100 can be accessed by users 12 executing various applications. Applications can include web servers, print servers, web staging, terminal servers, SQL servers, and so on. For example, application 1 can be a database application that is accessed by multiple users. Each data table in the database can be stored in its own data object 104. Thus, for instance, FIG. 1 shows that application 1 is using two data objects (DO1, DO2), application 2 is using one data object (DO3), and so on. Reading and writing to a data object 104 (e.g., DO1) includes making disk I/O requests with the disk storage system 102. The stream of I/O requests associated with a data object (e.g., DO1) can be referred to as "workload." As shown in FIG. 1, workloads among the applications 1-4 are concurrent; I/O requests from any workload can be made to the datacenter 100 at any time. Some applications can be associated with multiple workloads. Application 1, for example, might be a database application having one workload to read/write data object DO1 (e.g., a data table in the database) and another workload to read/write data object DO2 (e.g., another data table in the database).

Figure 1A:
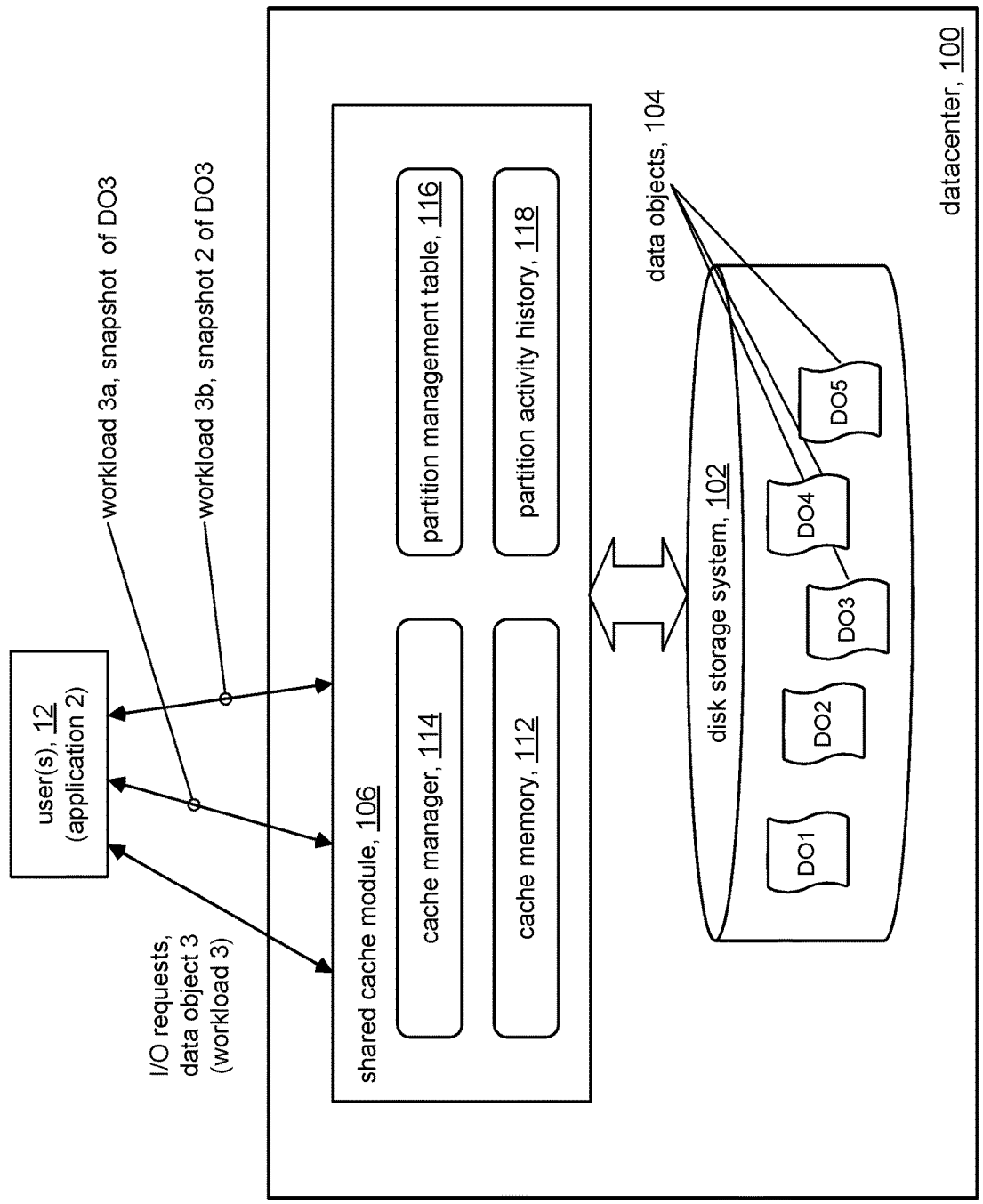
FIG. 1A illustrates an example of multiple workloads in an application.

In some embodiments, multiple workloads can arise in a data protection scenario. For example, the datacenter 100 can provide snapshot technology to allow users to take local data snapshots of a data object to protect business critical data in case of a failure. Referring to FIG. 1A, for instance, consider application 2. The workload is initially with data object DO3. As changes are made to the data object DO3, snapshots of the data object are made. Each snapshot of the data object results in a separate workload with that snapshot. FIG. 1A, for examples, shows workload 3 associated data object DO3, another workload 3a associated with snapshot 1 of DO3, workload 3b associated with snapshot 2 of DO3, and so on.

Figure 2:
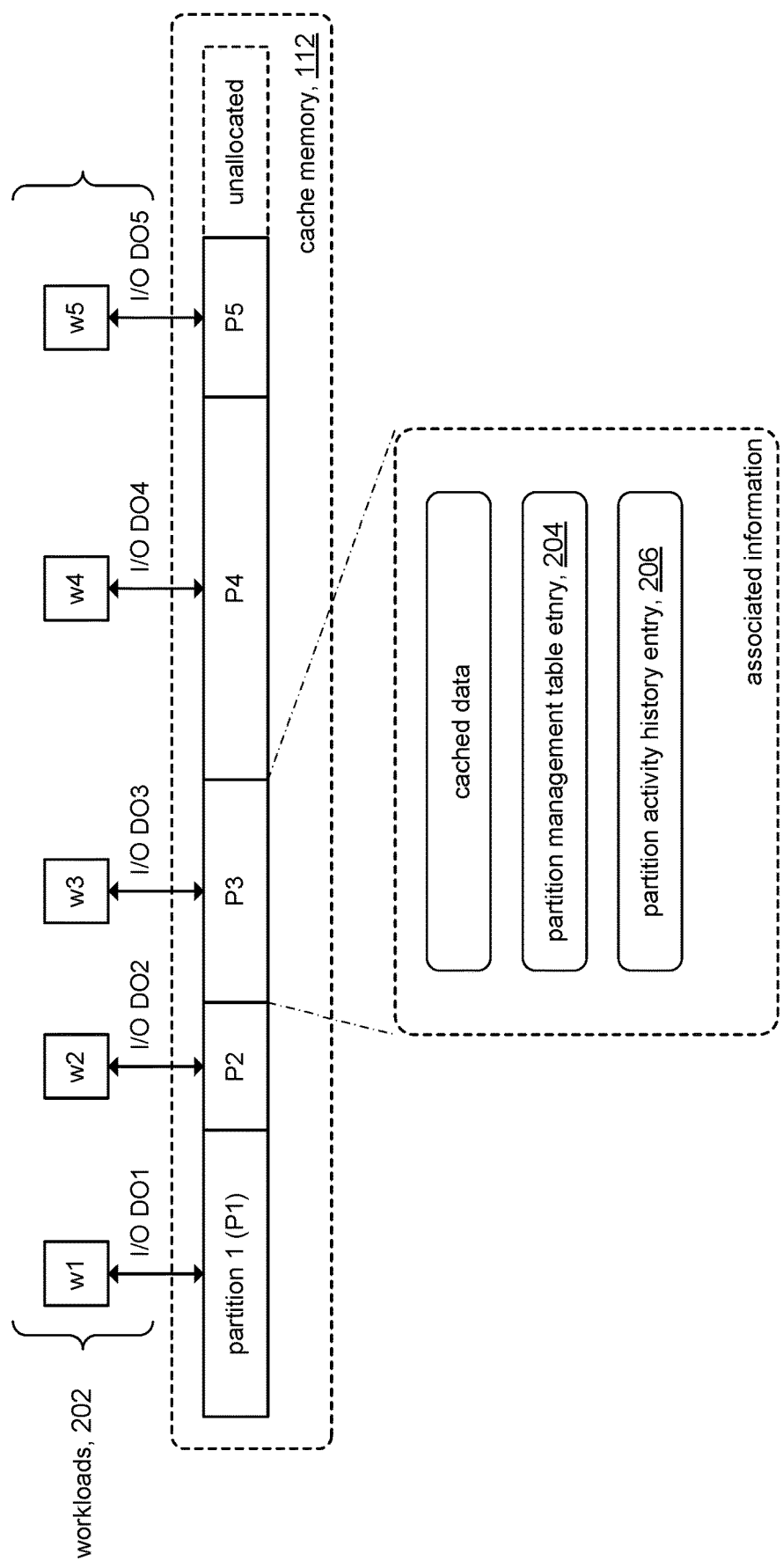
FIG. 2 shows some details of a cache memory in accordance with some embodiment of the present disclosure.

FIG. 2 shows details of a cache memory 112 and associated information, in accordance with some embodiments of the present disclosure. The cache memory 112 can comprise a set of cache slots (not shown); merely to illustrate for example, in a particular instance, the cache memory 112 may comprise 100,000 cache slots in total. The cache slots can be apportioned into logical partitions (P1, P2, etc.), where each logical partition can be exclusively allocated to a workload. FIG. 2, for example, show workloads 202 allocated to respective partitions of the cache memory 112. Each partition is exclusive to its respective workload 202. As explained above, a workload refers to I/O operations performed on the disk storage system 102 to read and write a data object associated with that workload. Thus, workload w1 represents the I/O for reading and writing data object DO1, workload w2 represents the I/O for reading and writing data object DO2, and so on. In accordance with the present disclosure, the I/O operations for a workload are cached using only the partition associated with that workload. For example, the I/O associated with workload w1 is cached using only partition 1, the I/O associated with workload w2 is cached using only partition 2, and so on.

Each partition (e.g., partition 3) has various information associated with it. First, there is the actual data that is being cached in the cache slots apportioned to the partition. As explained above, the cached data can be the actual data stored in the data object, or can be metadata that is associated with the data object.

Figure 2A:
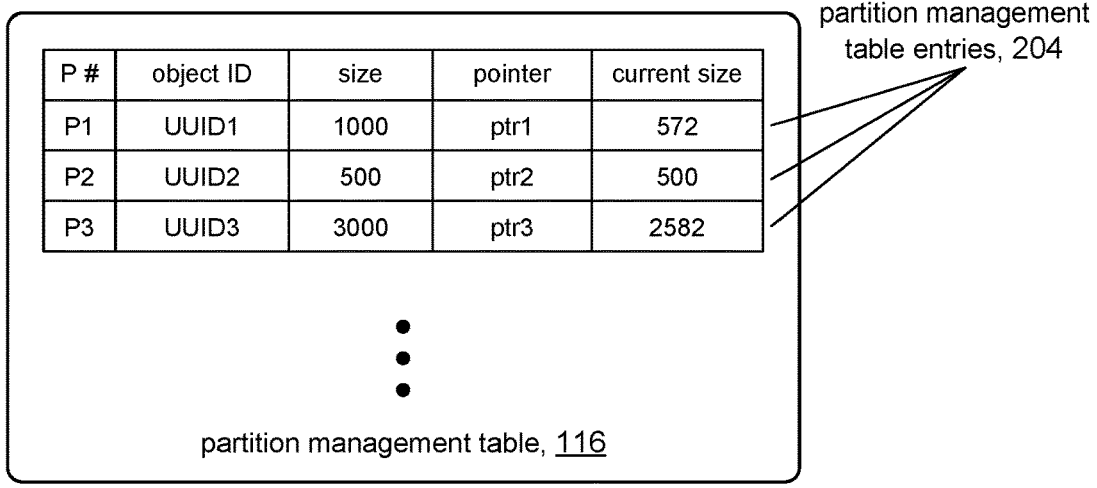
FIG. 2A shows an illustrative example of a partition management table.

Each partition can be associated with a corresponding entry 204 in the partition management table 116. Referring for a moment to FIG. 2A, in some embodiments the partition management table 116 can include respective partition management table entries 204 for each of the cache partitions P1, P2, etc. Each entry 204 can include information that describes its associated partition. For example, each entry 204 can include an object ID to identify the data object that is associated with a given partition; for instance, partition P1 is associated with a data object that is identified by UUID1. Each entry 204 can include a size designation that indicates the number of cache slots that a given partition is apportioned; for instance, partition P1 has a size designation of 1000 meaning that 1000 cache slots are allocated to partition P1, meaning that partition P1 can use 1000 cache slots in cache memory 112 to cache data for its associated data object. The size designation, therefore, can be representative of an amount of cache storage (partition size) in the cache memory 112 that is allocated to that partition, and hence is associated with the data object for caching data. These aspects of the present disclosure are discussed in more detail below. Each entry 204 can include a pointer and a current size, which are discussed in more detail below. It will be appreciated that each entry 204 can contain additional information to describe other aspects of the associated partition.

Figure 2B:
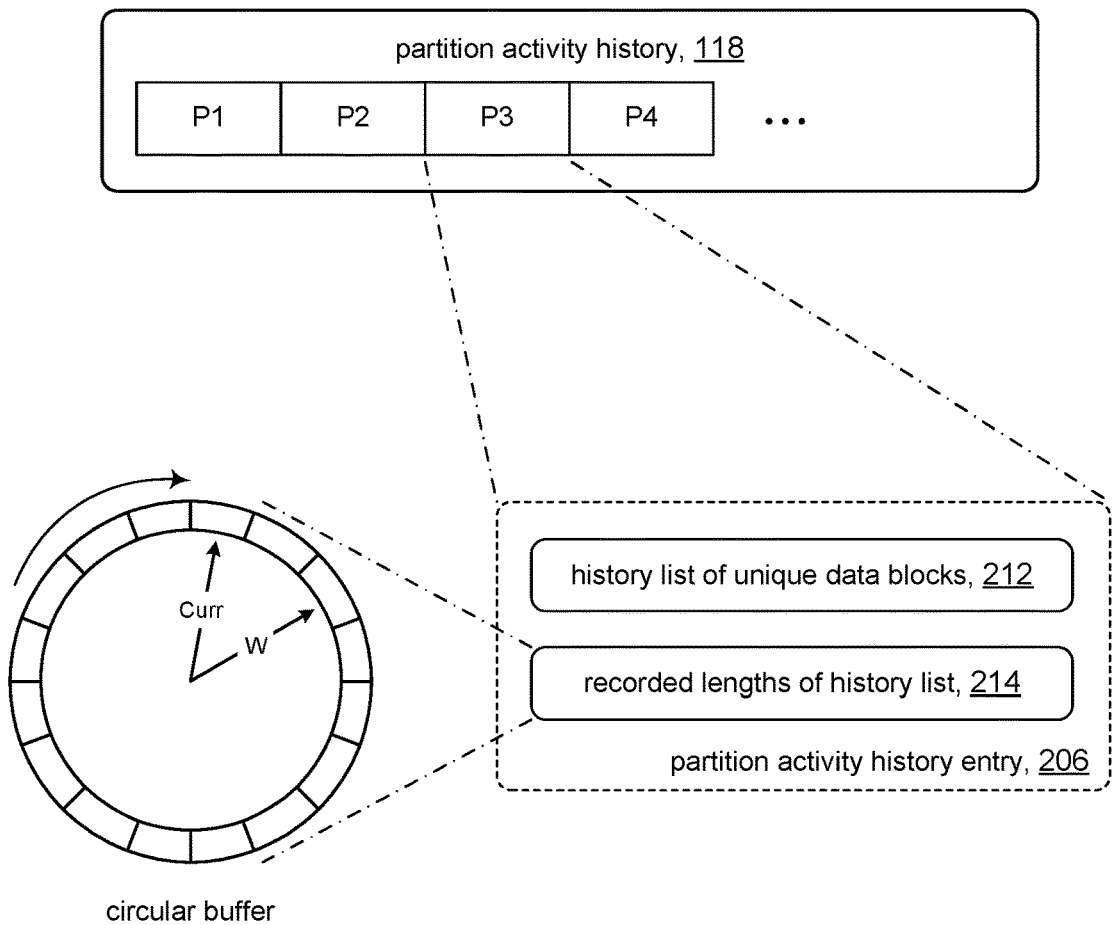
FIG. 2B shows an illustrative example of a partition activity history.

Returning to FIG. 2, each partition can be associated with a corresponding entry 206 in the partition activity history 118 (FIG. 1). Referring to FIG. 2B, in some embodiments the partition activity history 118 can include respective partition activity history entries 206 for each of the cache partitions P1, P2, etc. Each entry 206 can include a data block list 212 that records identifiers of unique data blocks cached in the associated partition. In accordance with some embodiments, the data block list 212 can be cleared from time to time, with the list starting over each time it is cleared. Each entry 206 can include a length list 214 that records the number of unique data blocks recorded in the data block list 212 at the time it is cleared. In some embodiments, the length list 214 can be implemented as a circular buffer of a given suitable size. These aspects of the present disclosure are discussed in more detail below.

Figure 3A:
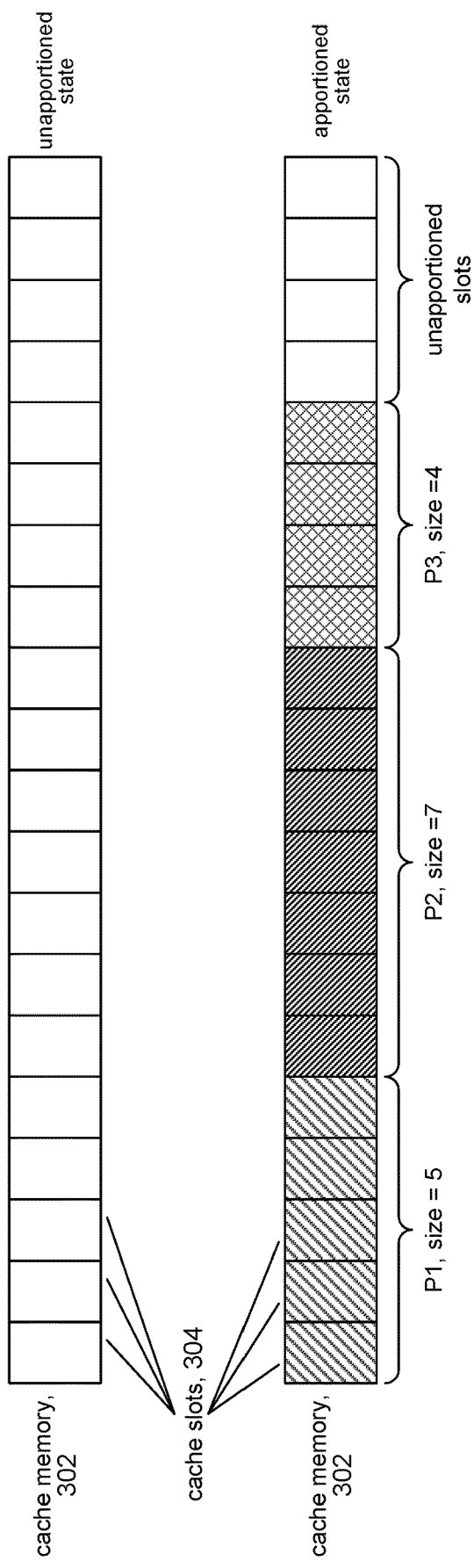
FIGS. 3A and 3B illustrate examples to explain partitions of a cache memory in accordance with the present disclosure.

Referring to FIG. 3A, as explained above in accordance with the present disclosure, the cache slots comprising a cache memory can be apportioned into logical cache partitions. FIG. 3A, for example, shows a cache memory 302 comprising cache slots 304 in an unapportioned state in which the cache memory 302 is not partitioned/allocated, such as might be the situation when the shared cache module 106 is first booted up. FIG. 3A shows the cache memory 302 apportioned into a cache partition P1 having size 5, a cache partition P2 having size 7, and a cache partition P3 having size 4, and an unapportioned/unallocated cache partition.

Figure 3B:
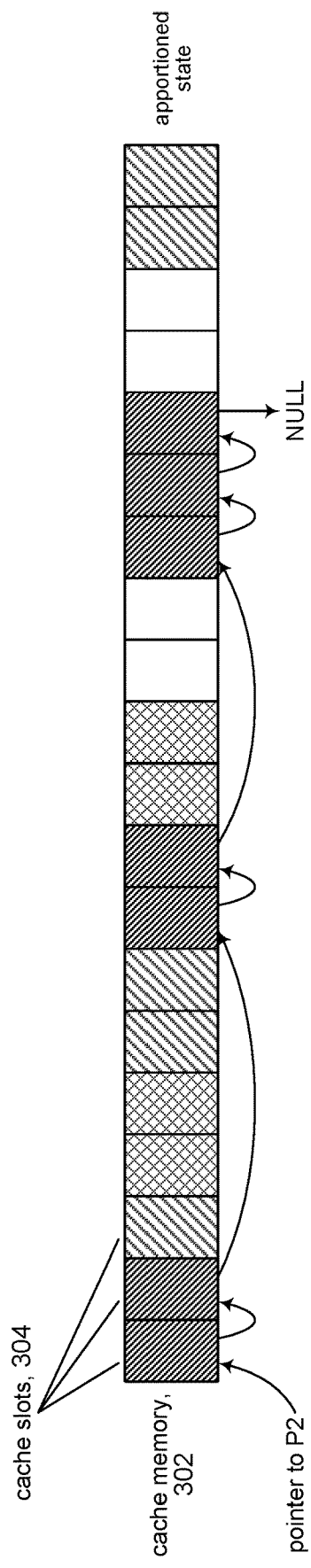

The representation shown in FIG. 3A is a logical representation of cache partitions P1, P2, P3. In typical use cases, data in a cache partition is cached and evicted from cache memory independently of other cache partitions. Accordingly, the cache slots in the cache memory that comprise the cache partitions can become intermixed over time. FIG. 3B illustrates a representation of cache partitions (or simply "partitions") P1, P2, P3 in a more typical use case, where the cache slots 304 that are apportioned to a give partition (e.g., P1) are scattered throughout the cache memory 302. The partitions are therefore referred to as "logical partitions" in the sense that they do not necessarily comprise contiguous groups of cache slots 304, but rather the constituent cache slots 304 of a partition can be scattered throughout the cache memory 302 as illustrated in FIG. 3B.

In some embodiments, the cache slots 304 can be linked to define one or more linked lists. In the unapportioned state in FIG. 3A, for example, the cache slots 304 can be linked to define a single linked list of unused cache slots, whereas in an apportioned state (FIG. 3B), the cache slots 304 can be reconfigured by updating links to define three different linked lists, one for each partition P1, P2, P3, and a linked list of the unused/unapportioned cache slots. FIG. 3B, for example, shows a linked list for partition P2, that includes a pointer to the head of the list and each cache slot pointing to the next slot in the list. Each partition P1, P2, P3 can be defined in this way, and the pointer to the head of the linked list for each partition can be stored in a pointer data field in the partition management table 116, such as shown for example in FIG. 2A. Although the figures show a linked list structure, it will be appreciated that cache memory 112 can be implemented using other suitable data structures such as a hash table, a balanced binary tree, and the like for fast searches.

In accordance with some embodiments of the present disclosure, the partitions can be dynamically allocated instead of statically allocated. FIG. 3A, for example, represents a configuration in accordance with some embodiments, where partitions are statically allocated. For example, partition P1 having size 5 is shown with all five cache slots 304 allocated to partition P1, and similarly for partitions P2 and P3.

In other embodiments, a partition can be defined only in terms of its allocated size and its associated disk object (UUID), without actually allocating cache slots 304 from the cache memory 302 to the partition. For example, a newly defined partition of size 5 would not be allocated any cache slots 304 from the cache memory 302. Cache slots 304 would be allocated (linked) to the partition when caching I/O operations on the data object associated with the partition. This dynamic allocation of cache slots 304 to the partition can continue until the partition size is reached; in this example, until a maximum of five cache slots 304 are allocated to the partition. After reaching the maximum, a cache entry will need to be evicted in order to accommodate a new one.

In still other embodiments, a partition can be defined in terms of its allocated size and with some initial allocation of cache slots 304. For example, a newly defined partition of size 100 may be initially allocated 20 cache slots 304. Additional cache slots 304 can be dynamically linked in until the number of cache slots 304 reaches size 100.

Figure 4:
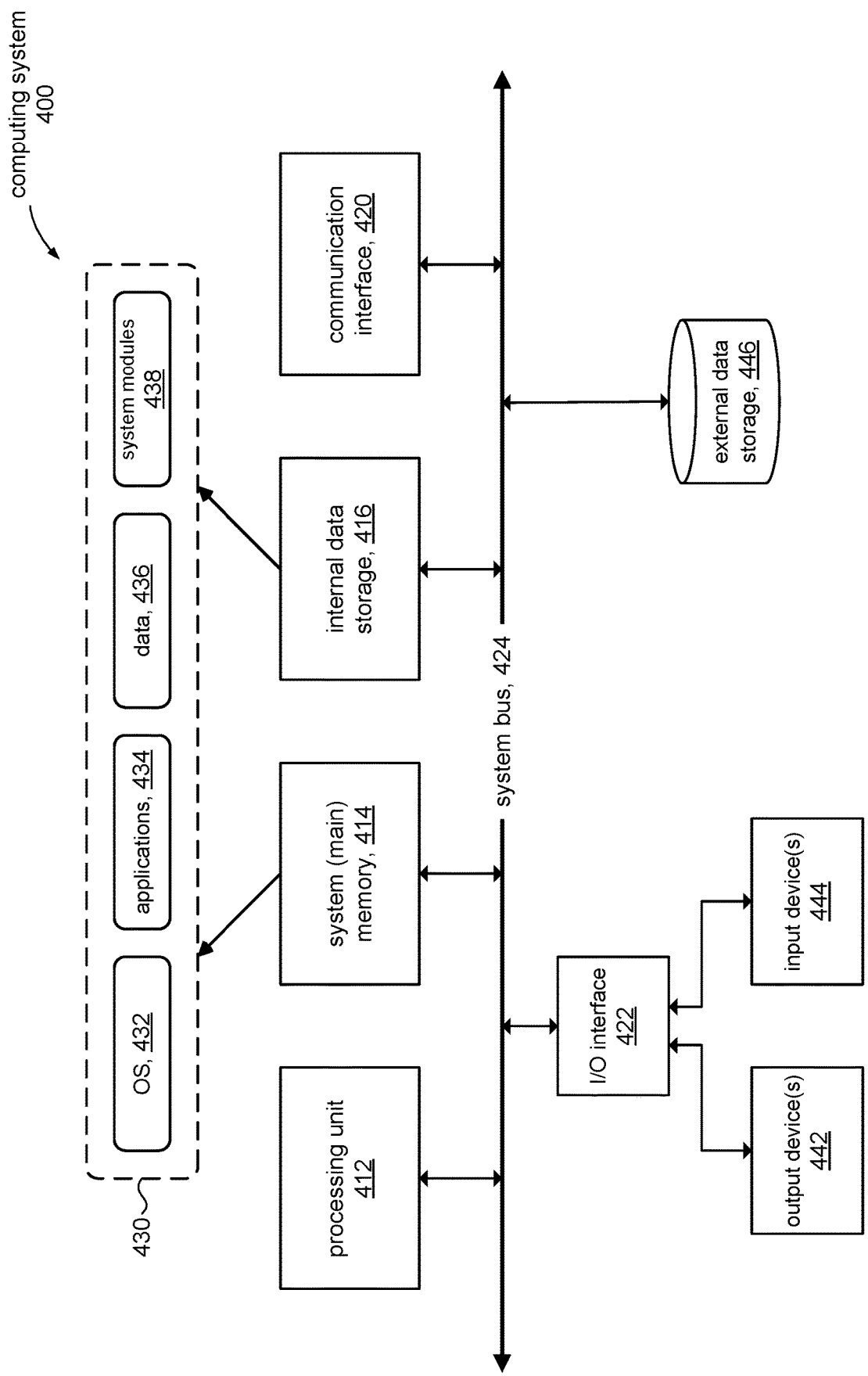
FIG. 4 shows an example of a computer system components in with the present disclosure.

FIG. 4 is a simplified block diagram of an illustrative computing system 400 for implementing one or more of the embodiments described herein (e.g., datacenter 100, FIG. 1). The computing system 400 can perform and/or be a means for performing, either alone or in combination with other elements, operations in accordance with the present disclosure. Computing system 400 can also perform and/or be a means for performing any other steps, methods, or processes described herein.

Computing system 400 can include any single- or multi-processor computing device or system capable of executing computer-readable instructions. Examples of computing system 400 include, for example, workstations, laptops, servers, distributed computing systems, and the like. In a basic configuration, computing system 400 can include at least one processing unit 412 and a system (main) memory 414.

Processing unit 412 can comprise any type or form of processing unit capable of processing data or interpreting and executing instructions. The processing unit 412 can be a single processor configuration in some embodiments, and in other embodiments can be a multi-processor architecture comprising one or more computer processors. In some embodiments, processing unit 412 can receive instructions from program and data modules 430. These instructions can cause processing unit 412 to perform operations in accordance with the various disclosed embodiments (e.g., FIGS. 5-8) of the present disclosure.

System memory 414 (sometimes referred to as main memory) can be any type or form of storage device or storage medium capable of storing data and/or other computer-readable instructions, and comprises volatile memory and/or non-volatile memory. Examples of system memory 414 include any suitable byte-addressable memory, for example, random access memory (RAM), read only memory (ROM), flash memory, or any other similar memory architecture. Although not required, in some embodiments computing system 400 can include both a volatile memory unit (e.g., system memory 414) and a non-volatile storage device (e.g., data storage 416, 446).

In some embodiments, computing system 400 can include one or more components or elements in addition to processing unit 412 and system memory 414. For example, as illustrated in FIG. 4, computing system 400 can include internal data storage 416, a communication interface 420, and an I/O interface 422 interconnected via a system bus 424. System bus 424 can include any type or form of infrastructure capable of facilitating communication between one or more components comprising computing system 400.

Internal data storage 416 can comprise non-transitory computer-readable storage media to provide nonvolatile storage of data, data structures, computer-executable instructions, and so forth to operate computing system 400 in accordance with the present disclosure. For instance, the internal data storage 416 can store various program and data modules 430, including for example, operating system 432, one or more application programs 434, program data 436, and other program/system modules 438 to implement structures comprising the shared cache module 106 and to support and perform various processing and operations performed by the cache manager 114.

Communication interface 420 can include any type or form of communication device or adapter capable of facilitating communication between computing system 400 and one or more additional devices. For example, in some embodiments communication interface 420 can facilitate communication between computing system 400 and a private or public network including additional computing systems. Examples of communication interface 420 include, for example, a wired network interface (such as a network interface card), a wireless network interface (such as a wireless network interface card), a modem, and any other suitable interface.

In some embodiments, communication interface 420 can also represent a host adapter configured to facilitate communication between computing system 400 and one or more additional network or storage devices via an external bus or communications channel. Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 400 can also include at least one output device 442 (e.g., a display) coupled to system bus 424 via I/O interface 422, for example, to provide access to an administrator. The output device 442 can include any type or form of device capable of visual and/or audio presentation of information received from I/O interface 422.

Computing system 400 can also include at least one input device 444 coupled to system bus 424 via I/O interface 422, e.g., for administrator access. Input device 444 can include any type or form of input device capable of providing input, either computer or human generated, to computing system 400. Examples of input device 444 include, for example, a keyboard, a pointing device, a speech recognition device, or any other input device.

Computing system 400 can also include external data storage subsystem 446 coupled to system bus 424. In some embodiments, the external data storage 446 can be accessed via communication interface 420. External data storage 446 can be a storage subsystem comprising a storage area network (SAN), network attached storage (NAS), virtual SAN (VSAN), and the like. External data storage 446 can comprise any type or form of block storage device or medium capable of storing data and/or other computer-readable instructions. For example, external data storage 446 can be a magnetic disk drive (e.g., a so-called hard drive), a solid state drive, a floppy disk drive, a magnetic tape drive, an optical disk drive, a flash drive, or the like. In some embodiments, for example, the disk storage system 102 in FIG. 1 can comprise external data storage subsystem 446.

Figure 5A:
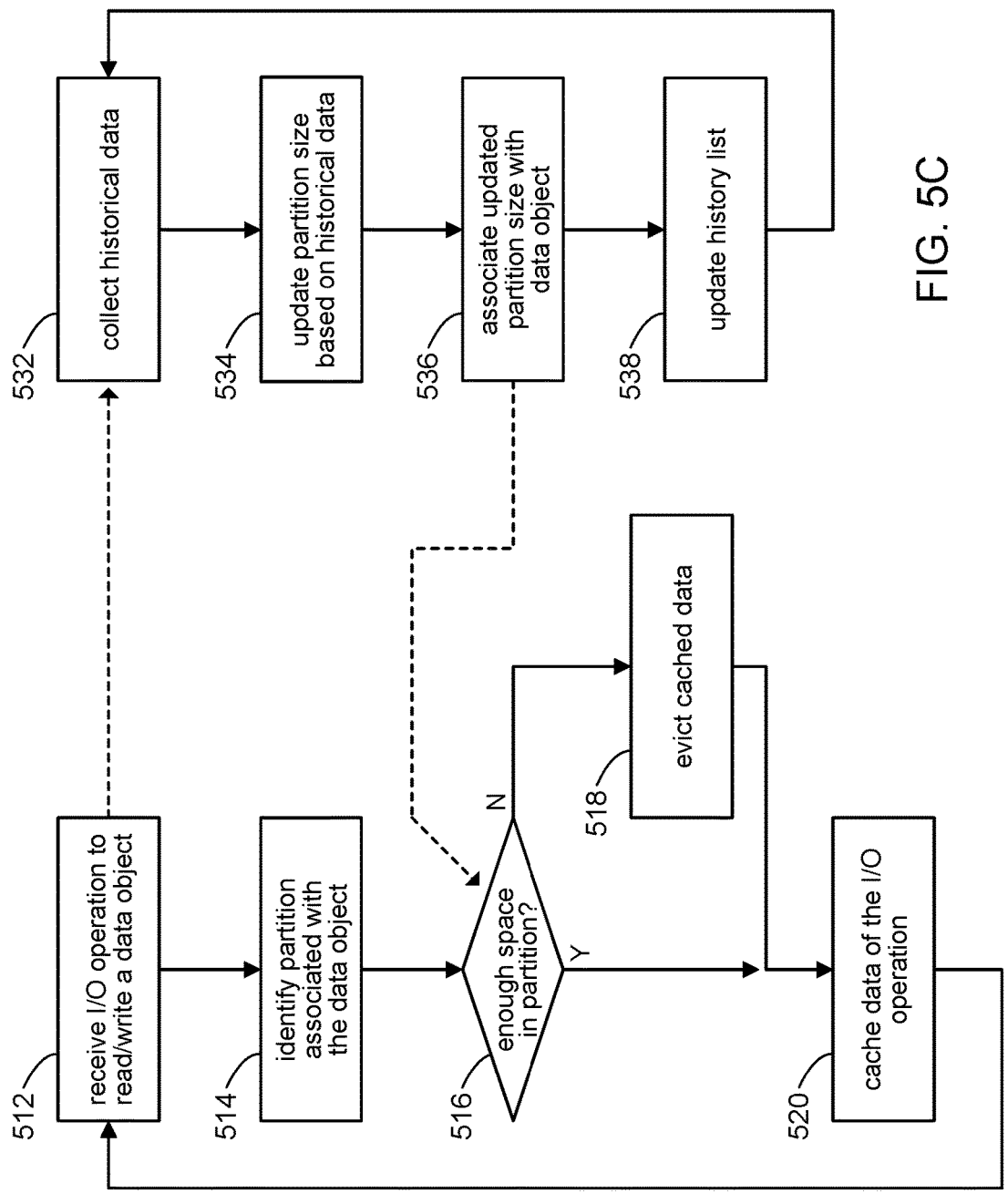
Figure 5A:
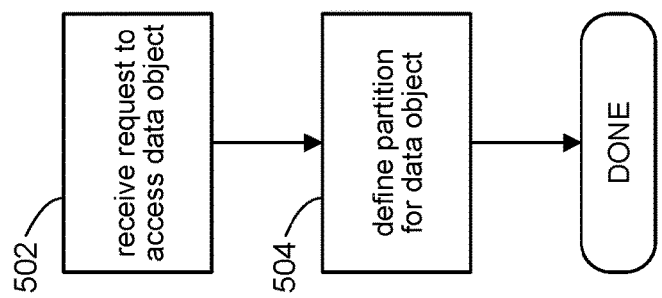

Referring to FIGS. 5A, 5B, and 5C, and other figures, the discussion will now turn to a high level description of operations and processing in the cache manager 114 to manage the cache memory 112 in accordance with the present disclosure. In some embodiments, for example, the cache manager 114 can include computer executable program code, which when executed by a computer processor (e.g., 402, FIG. 4), can cause the cache manager 114 to perform processing in accordance with FIGS. 5A-5C. The operation and processing blocks described below are not necessarily executed in the order shown, and can be allocated for execution among one ore more concurrently executing processes and/or threads.

Referring to FIGS. 5A and 5B, the cache manager 114 can share a global cache (e.g., cache memory 112) among a plurality of workloads in accordance with the present disclosure by partitioning the cache so that each workload has its own exclusive partition. Each partition tracks and evicts its own cached data based on its own partition size. Therefore, the exclusive cache partition mechanism can provide cache resource isolation among multiple concurrent workloads and thus avoid one workload from affecting another workload, thus improving performance in disk access in the computer system.

In FIG. 5A, at block 502, the cache manager 114 can access a data object 104 (e.g., DO1) in response to an access request. In some instances, the access request can be to open an existing data object 104, for example using a system call such as "open( )," for subsequent read and write operations on the data object 104. In some instances, the access request can be to create a data object can be created, for example, using a system call such as "creat( )." Both system calls can return a suitable handle that the application can then use to identify the data object 104 for read and write operations; e.g., using systems calls such as "read( )" and "write( )." In some embodiments, the disk storage system 102 may create its own identifiers (e.g., UUIDs) to identify its data objects 104. Accordingly, the handle may be mapped to the corresponding UUID, for example by the "read( )" and "write( )" system calls, so that the disk storage system 102 can identify the data object 104.

At block 504, the cache manager 114 can associate a partition size with the accessed data object 104, thus creating a logical partition (discussed above) that is associated with the accessed data object. In some embodiments, all newly created partitions can be assigned a fixed size. In other embodiments, the size of a newly created partition can be the number of the unallocated cache slots (e.g., 304) in the cache memory 112. The cache manager 114 can create an entry 204 in the partition management table 116 to record the partition size for the created partition and an identifier of the accessed data object 104 that the partition is associated with. Processing of an access request can be deemed complete.

In FIG. 5B, at block 512, the cache manager 114 can receive an I/O operation to read from or write data to a data object 104 specified in the received I/O operation. In the case of a read operation, data may be read from cache if it is already cached or read in from the disk storage system 102. Data read in from the disk storage system 102 can then be cached. In the case of a write operation, data may be written to the cache instead of or in addition to being written to the disk storage system 102 before sending confirmation to users. The data will be written into persistent storage at a more appropriate time that is batched with other writes. FIG. 5B shows that the cache manager 114 can further process the received I/O operations to collect historical data (block 532). This aspect of the present disclosure is discussed below.

At block 514, the cache manager 114 can identify the partition that is associated with the data object identified in the received I/O operation. In some embodiments, for example, the cache manager 114 can determine an object identifier (e.g., UUID) of the data object from the received I/O operation. The cache manager 114 can use the object identifier to access the partition entry 204 in the partition management table 116 that corresponds to the data object. The accessed partition entry 204 includes a pointer in the cache memory 116 to the beginning of the logical partition associated with the data object; see, for example, pointer to partition P2 in FIG. 3B. The accessed partition entry 204 includes a size attribute which can represent a partition size that is associated with the data object.

At block 516, the cache manager 114 can determine if the partition associated with the data object has enough space to cache the data in the received I/O operation. In some embodiments, for example, the cache manager 114 can determine the block or range of blocks that are the target of the I/O operation, and hence the amount of data to be cached. If the amount of space needed to cache data associated with the received I/O operation plus the data that is already cached in the associated partition does not exceed the partition size associated with the data object, then processing can proceed to block 520 to perform caching in accordance with the present disclosure; otherwise, processing can proceed to block 518 to evict data cached in the partition associated with the data object. In accordance with the present disclosure, the amount of data that can be cached for a data object limited to the partition size associated with the data object, irrespective of the amount of available space in the cache memory 112.

At block 518, the cache manager 114 can evict cached data from the associated partition when the amount of data associated with the data object that is cached in the cache memory reaches the partition size associated with the data object. In some embodiments, for example, the cache manager 114 can evict just enough data to cache the data in the received I/O operation (block 516). In other embodiments, more data can be evicted than is needed for caching the I/O operation. Any suitable eviction algorithm can be used to determine which data should be evicted; e.g., a least recently use (LRU) algorithm will evict the least recently used of the cached data. Processing can continue to block 520.

At block 520, the cache manager 114 can cache the data associated with the received I/O operation. In some embodiments, for example, the cache manager 114 can traverse or otherwise search the linked list of cache slots that constitute the partition associated with the data object identified in the received I/O operation. For a read operation, data that is already cached can be read from the cache partition. Data that is not already cached can be read in from the disk storage system 102 and cached in one or more available cache slots in the cache memory 112, where each cache slot is linked into the linked list associated with the partition and increases the current size (FIG. 2A) of the partition. Likewise, a write operation can be processed by writing the data to one or more cache slots in the cache memory 112 (referred to as a write-back cache policy), where for example each cache slot is linked into the linked list associated with the partition and increases the current size of the partition. Processing of the received I/O operation can be deemed complete, and processing can return to block 512 to receive and process the next I/O operation.

Referring to FIG. 5C, the cache manager 114 can collect historical data relating to I/O performed on the data objects. In accordance with the present disclosure, the historical data can be used to change the partition sizes of the partitions associated with data objects managed by the cache manager 114 in order to accommodate time-varying workloads among different data objects in the shared cache memory 112. For example, data objects with busy workloads can potentially consume all the shared cache memory 112 (so called noisy neighbors) and thus deprive less active workloads with access to the cache memory. In accordance with the present disclosure, partitioning/reserving the cache memory 112 can ensure that each workload has access to at least a portion of the cache memory 112. Varying the partition sizes further ensures that different workloads get more (or less) of their share of the cache memory so that every workload has a fair share of the cache memory. Cache partitioning with dynamically adjustable sizes can significantly improve performance in a computer system (e.g., datacenter 100) having a cache memory system that is shared among multiple workloads. The operations shown in FIG. 5C can be performed for each data object that is associated with a partition.

At block 532, the cache manager 114 can record a list (212, FIG. 2B) of the unique blocks of data that are cached to a given partition associated with a data object; data blocks, for example, can be tracked by their LBAs or PBAs. In some embodiments, the cache manager 114 can perform a data collection round by recording the unique block addresses to the unique block list 212 that are cached to the given partition during an interval of time. At the end of the time interval, the cache manager 114 can store the number of unique block addresses recorded in the unique block list 212 to an entry in a length history list (e.g., 214, FIG. 2B), and then clear the unique block list 212 for another data collection round. The interval of time between data collection rounds can be on the order of tens of seconds, every minute, or other suitable interval of time. In some embodiments, the time interval between data collection rounds can vary depending on the number of partitions in the cache memory, the frequency of I/O operations, the data collected in the length history 214, and so on.

The length history 214 can be a circular buffer, as shown for example in FIG. 2B. A current pointer (Curr) can identify the current beginning of the length history 214. The write pointer (W) indicates where to write the next item in the length history 214, advancing in a clockwise direction one step for every round of data collection. When the write pointer W advances to the current pointer Curr, processing can proceed to block 534. The circular buffer creates a moving time window of the historical data that is recorded by the length history 214. In a particular instance, for example, the circular buffer comprises 180 entries and the time interval between data collection rounds is one minute, thus recording a three hour length history.

At block 534, the cache manager 114 can update the partition size of a given partition. In some embodiments, for example, a percentile filter can be applied to the length history 214 to determine an updated partition sized. A percentile filter can filter out temporary length spikes from the length history 214; spikes, for example, can be caused by large-range sequential scan of the data object. In some embodiments, the 95$^{th}$ percentile value can serve as the basis for the update; i.e., the number of data blocks that is in the 95$^{th}$ percentile can be used to determine the next partition size. In some embodiments, we can take two times the 95$^{th}$ percentile value as the next partition size, although a factor other than two can be used. In some embodiments, a minimum partition size may be imposed in certain edge cases; for example, where the 95$^{th}$ percentile value might be too small. In some embodiments, the partition size may be capped based on the amount of space remaining in the cache memory 112, such that the sum of all the partition sizes does not exceed the available space in the cache memory 112.

At block 536, the cache manager 114 can update the partition size of the given with the value computed in block 534. In some embodiments, for example, the cache manager 114 can update the entry 204 (FIG. 2A) corresponding to the given partition with the updated partition size so that the updated partition size can be used in the determination made in block 516.

At block 538, the cache manager 114 can delete one or more entries in the history list 214 to advance the current pointer Curr to a new beginning position in the circular buffer accordingly. Moving the current pointer Curr advances the moving time window of historical data by an amount of time that can be determined by the number of entries that are deleted from the history list 214 times the interval of time between data collection rounds. Processing can the return to block 532 to collect more history data. The process repeats when the write pointer W once again reaches the current pointer Curr.

The history data provides an indicator for changes in the amount of I/O performed on a data object (workload). When the workload increases, the partition size associated with the data object can be increased to allocates more space in the cache memory to accommodate the increased I/O on data object. Conversely, when the workload decreases, the partition size associated with the data object can be likewise decreased in order to free up cache memory for other data objects in the system when their workloads increase. This automatic an dynamic updating of the partition size improves performance of the cache memory by ensuring that data objects have a fair share of the cache memory as their workloads vary, and thus maintain a relatively constant cache hit rate for each data object. As the amount I/O increases for a data object, more cache is allocated (i.e., its partition size is increased) in order to avoid increasing the cache miss rate. When the amount of I/O on the data object decreases, less cache is needed so the partition size for that data object can be decreased, which gives other data access to more cache memory (if needed), while at the same time maintaining an acceptable cache hit rate for the data object.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
a computer system accessing a data object stored on a disk storage system to read data from and write data to the data object;
the computer system associating a partition size with the data object, the partition size representing an amount of cache storage in a cache memory for caching read and write operations with the data object;
the computer system caching input/output (I/O) operations for reading data from and writing data to the data object, including limiting data associated with the I/O operations that are cached in the cache memory to an amount based on the partition size associated with the data object;
the computer system collecting a history of data associated with the data object that have been cached in the cache memory; and
the computer system determining, based on the collected history, a revised partition size and updating the partition size associated with the data object based on the revised partition size,
wherein the amount of data that is cached in the cache memory for input/output (I/O) operations on the data object made subsequent to updating the partition size associated with the data object is limited to the updated partition size.

2. The method of claim 1, further comprising evicting data associated with the data object from the cache memory when the amount of data associated with the data object that is cached in the cache memory reaches the partition size associated with the data object.

3. The method of claim 1, further comprising evicting data associated with the data object from the cache memory based only on the partition size associated with the data object, irrespective of the amount of unused cache storage in the cache memory.

4. The method of claim 1, further comprising periodically updating the partition size associated with the data object based on the collected history, wherein the maximum amount of data that is cached in the cache memory for the data object varies according to the updated partition size.

5. The method of claim 1, further comprising accessing additional data objects stored on the disk storage system for performing input/output (I/O) on the additional data objects and associating a respective partition size with each additional data object, wherein a maximum amount of data that is cached in the cache memory for each additional data object is based on its respective partition size.

6. The method of claim 5, further comprising periodically updating the respective partition size associated with each additional data object.

7. The method of claim 1, wherein updating the partition size associated with the data object includes deleting the collected history and collecting new history during subsequent input/output (I/O) operations for reading and writing the data object.

8. A non-transitory computer-readable storage medium having stored thereon computer executable instructions, which when executed by a computer device, cause the computer device to:
access a data object stored on a disk storage system to read data from and write data to the data object;

associate a partition size with the data object, the partition size representing an amount of cache storage in a cache memory for caching read and write operations with the data object;

cache input/output (I/O) operations for reading data from and writing data to the data object, including limiting data associated with the I/O operations that are cached in the cache memory to an amount based on the partition size associated with the data object;

collect a history of data associated with the data object that have been cached in the cache memory; and determine, based on the collected history, a revised partition size and update the partition size associated with the data object based on the revised partition size, wherein the amount of data that is cached in the cache memory for I/O operations on the data object made subsequent to updating the partition size associated with the data object is limited to the updated partition size.

9. The non-transitory computer-readable storage medium of claim 8, wherein the computer executable instructions, which when executed by the computer device, further cause the computer device to evict data associated with the data object from the cache memory when the amount of data associated with the data object that is cached in the cache memory reaches the partition size associated with the data object.

10. The non-transitory computer-readable storage medium of claim 8, wherein the computer executable instructions, which when executed by the computer device, further cause the computer device to evict data associated with the data object from the cache memory based only on the partition size associated with the data object, irrespective of the amount of unused cache storage in the cache memory.

11. The non-transitory computer-readable storage medium of claim 8, wherein the computer executable instructions, which when executed by the computer device, further cause the computer device to periodically update the partition size associated with the data object based on the collected history, wherein the maximum amount of data that is cached in the cache memory for the data object varies according to the updated partition size.

12. The non-transitory computer-readable storage medium of claim 8, wherein the computer executable instructions, which when executed by the computer device, further cause the computer device to access additional data objects stored on the disk storage system for performing input/output (I/O) on the additional data objects and associate a respective partition size with each additional data object, wherein a maximum amount of data that is cached in the cache memory for each additional data object is based on its respective partition size.

13. The non-transitory computer-readable storage medium of claim 12, wherein the computer executable instructions, which when executed by the computer device, further cause the computer device to periodically update the respective partition size associated with each additional data object.

14. The non-transitory computer-readable storage medium of claim 8, wherein updating the partition size associated with the data object includes deleting the collected history and collecting new history during subsequent input/output (I/O) operations for reading and writing the data object.

15. An apparatus comprising:
one or more computer processors; and
a computer-readable storage medium comprising instructions for controlling the one or more computer processors to be operable to:

access a data object stored on a disk storage system to read data from and write data to the data object;

associate a partition size with the data object, the partition size representing an amount of cache storage in a cache memory for caching read and write operations with the data object;

cache input/output (I/O) operations for reading data from and writing data to the data object, including limiting data associated with the I/O operations that are cached in the cache memory to an amount based on the partition size associated with the data object;

collect a history of data associated with the data object that have been cached in the cache memory; and determine, based on the collected history, a revised partition size and update the partition size associated with the data object based on the revised partition size, wherein the amount of data that is cached in the cache memory for I/O operations on the data object made subsequent to updating the partition size associated with the data object is limited to the updated partition size.

16. The apparatus of claim 15, wherein the computer-readable storage medium further comprises instructions for controlling the one or more computer processors to be operable to evict data associated with the data object from the cache memory when the amount of data associated with the data object that is cached in the cache memory reaches the partition size associated with the data object.

17. The apparatus of claim 15, wherein the computer-readable storage medium further comprises instructions for controlling the one or more computer processors to be operable to periodically update the partition size associated with the data object based on the collected history, wherein the maximum amount of data that is cached in the cache memory for the data object varies according to the updated partition size.

18. The apparatus of claim 15, wherein the computer-readable storage medium further comprises instructions for controlling the one or more computer processors to be operable to access additional data objects stored on the disk storage system for performing input/output (I/O) on the additional data objects and associate a respective partition size with each additional data object, wherein a maximum amount of data that is cached in the cache memory for each additional data object is based on its respective partition size.

19. The apparatus of claim 18, wherein the computer-readable storage medium further comprises instructions for controlling the one or more computer processors to be operable to periodically update the respective partition size associated with each additional data object.

20. The apparatus of claim 15, wherein associating the second partition size with the data object includes deleting the collected history and collecting new history during subsequent input/output (I/O) operations for reading and writing the data object.

* * * * *